United States Patent [19]

Nakatsu et al.

[11] Patent Number: 5,402,272

[45] Date of Patent: Mar. 28, 1995

[54] DIGITAL SIGNAL MAGNETIC RECORDING/REPRODUCING APPARATUS USING AMPLITUDE PHASE SHIFT KEYING AND FREQUENCY-MULTIPLEXING

[75] Inventors: Etsuto Nakatsu, Minoo; Haruo Ohta, Hirakata; Masaaki Kobayashi, Kawanishi, all of Japan

[73] Assignee: Matsushita Electric Industrial Co., Ltd., Osaka, Japan

[21] Appl. No.: 178,623

[22] Filed: Jan. 7, 1994

Related U.S. Application Data

[63] Continuation of Ser. No. 769,825, Nov. 2, 1992, abandoned.

[30] Foreign Application Priority Data

Oct. 4, 1990 [JP] Japan .................................. 2-267679
Nov. 5, 1990 [JP] Japan .................................. 2-300816

[51] Int. Cl.$^6$ .......................... G11B 5/09; G11B 20/10; G11B 5/02
[52] U.S. Cl. .......................... 360/39; 360/24; 360/29; 360/40
[58] Field of Search .................. 360/20, 24, 39, 40, 360/46, 65, 29

[56] References Cited

U.S. PATENT DOCUMENTS

| | | | |
|---|---|---|---|
| 4,979,052 | 12/1990 | Matsuta et al. | 360/40 |
| 5,062,007 | 10/1991 | Nakatsu et al. | 360/46 |
| 5,119,243 | 6/1992 | Shimazaki et al. | 360/46 |
| 5,124,861 | 6/1992 | Shimotashiro et al. | 360/65 |

OTHER PUBLICATIONS

*Signals & Systems* by Oppenheim, Willsky, and Young, ©1983, Prentice-Hall, Inc., N.J., p. 462.
"An Analytical Approach to the Standardization of Digital Videotape Recorders", Jurgen K. R. Heitmann, SMPTE Journal, pp. 229-232, Mar. 1982.
"Digital Television Recording with Low Tape Consumption", John L. E. Baldwin, SMPTE Journal, Jul. 1979, vol. 88, pp. 490-492.
"Signal System Design for a Digital Video Recording System", Luigi Gallo, SMPTE Journal, vol. 86, Oct. 1977, pp. 749-756.
"An Experimental Digital Video Recording System", IEEE Transactions on Consumer Electronics, vol. CE-32, No. 3, Aug. 1986, Driessen et al., pp. 362-371.
"THPM 13.6", Kobayashi et al., 1991 IEEE, pp. 192-193.
"Recording of Quadrature Amplitude-Modulated Signal on Magnetic Recording Channel", The Transactions of the IEICE, vol. E 73, No. 5, May 1990, Kobayashi et al., pp. 665-669.

*Primary Examiner*—Aristotelis Psitos
*Assistant Examiner*—Jennifer Gnann Pearson
*Attorney, Agent, or Firm*—Wenderoth, Lind & Ponack

[57] ABSTRACT

A digital signal magnetic recording/reproducing apparatus subjects a digital signal to a digital amplitude phase shift keying and records and reproduces the modulated signal thus obtained on a magnetic recording medium. Use of the digital amplitude phase shift keying technique makes it possible to remove the direct-current component in the recording signals, and to improve the utilization efficiency of the recording frequency band, thus making high density recording possible. In addition, since a plurality of modulated signals are frequency-multiplexed and recorded, almost the entire frequency band recordable on a magnetic recording medium can be utilized, resulting in an increase in recording density. Further in addition, a pilot signal produced by frequency-converting a carrier is frequency-multiplexed with a modulated signal and recorded and reproduced and the carrier is reproduced from the reproduced pilot signal, so that a redundant part for reproducing the carrier is not necessary.

4 Claims, 9 Drawing Sheets

DIGITAL SIGNAL MAGNETIC RECORDING/REPRODUCING APPARATUS USING AMPLITUDE PHASE SHIFT KEYING AND FREQUENCY-MULTIPLEXING

This application is a Continuation of now abandoned application Ser. No. 07/769,825, filed on Nov. 2, 1992.

BACKGROUND OF THE INVENTION

1. Field of the Invention

This invention relates to a digital signal magnetic recording/reproducing apparatus for use in digital video tape recorders and so on.

2. Description of the Prior Art

In conventional digital signal magnetic recording/reproducing apparatuses, due to the difficulty of recording/reproducing direct current components, baseband modulation techniques have been used for minimizing the direct current component in the recording signals, such as NRZ codes (e.g., J. K. R. Heitmann "An Analytical Approach to the Standardization of Digital Video Tape Recorder", SMPTE J., 91, 3, Mar. 1982, or J. K. R. Heitmann "Digital Video Recording, New Result in Channel Coding and Error Protection", SMPTE J., 93: 140–144, Feb. 1984), 8–10 block codes (e.g., J. L. E. Baldwin "Digital Television Recording with Low Tape Consumption", SMPTE J., 88: 490–492, July, 1979), Miller-square ($M^2$) codes (e.g., L. Gallo "Signal System Design for a Digital Video Recording System", SMPTE J., 86: 749–756, Oct. 1977), ternary partial response system, etc.

However, in the digital signal magnetic recording/reproducing apparatuses utilizing such baseband modulation techniques, due to the basic system of recording the binary signals, the utilization efficiency of the recording frequency band (transmissible bit rate per unit band) is low. For instance, if the roll-off rate of a Nyquist transmission system to be 0.5, then the utilization efficiency of the frequency band is at most 1.33 bits/sec./Hz. This incurs an increased tape consumption, providing an impediment to long time recording. Further, in order to increase the recording rate, a method of expanding the recording frequency band, a method of increasing the number of recording channels, or a method of increasing the relative velocity have been considered. However, if the recording frequency band is expanded, the S/N ratio is significantly deteriorated. Accordingly, the recording rate cannot be increased very much. When the number of recording channels is increased, the track width is narrowed and the S/N ratio is deteriorated. If the relative velocity is increased, the amount of tape consumption naturally increases.

To compensate for the deterioration of the S/N ratio, the error rate may be improved by using error control coding. However, the bit rate of the data which can be actually recorded is lost by such coding (Ref. L. M. H. E. Dreissen et al., "An Experimental Digital Video Recording System", IEEE Conf. Jun. 1986, or C. Yamamitsu et al., "An Experimental Digital VTR Capable of 12-hour Recording", IEEE Trans. on CE, CE-33, No. 3, pp. 240–248, 1987).

On the other hand, there has been proposed a coded modulation scheme effected by combining a multi-value modulation scheme, which has a high utilization efficiency of the frequency band, with error control coding for application to digital data transmission. This, however, does not give consideration on the special conditions such as the effect of non-linear distortion or the effect of saturation characteristics in the case of recording/reproducing on a magnetic recording medium (cf. G. Ungerboeck "Channel Coding with Multilevel/Phase Signals", IEEE Trans. on IT, IT-28, No. 1, pp. 55–67, 1982).

We have already proposed, as disclosed in the U.S. patent application Ser. No. 07/302,325, a digital signal magnetic recording/reproducing apparatus using an amplitude phase shift keying technique which can provide a high frequency efficiency and recording rate. When intending to record/reproduce digital signals being subjected to the amplitude phase shift keying, however, in order to obtain an error rate at a practical level (about $10^{-4}$), it is necessary to increase the S/N ratio, resulting in it being impossible to expand the frequency band of the recording signal. That is, only a part of the frequency band of a signal capable of being recorded on a magnetic recording medium can be utilized. As a result, only a slightly higher recording density than would be attained with a baseband modulation technique can be provided.

SUMMARY OF THE INVENTION

An object of this invention is to provide a high recording density digital signal magnetic recording/reproducing apparatus using an amplitude phase shift keying technique in which a plurality of modulated signals are frequency-multiplexed and recorded, or a modulated signal is frequency-multiplexed with a pilot signal which is obtained by frequency-converting a carrier.

In order to attain the above-mentioned object, a digital signal magnetic recording/reproducing apparatus of this invention comprises:

a dividing circuit for dividing an inputted digital signal into first to Nth digital signals (N is an integer of 2 or more) each having a specified number of bits;

first to Nth digital amplitude phase shift keying circuits for respectively performing digital amplitude phase shift keyings of first to Nth digital signals outputted from the dividing circuit so as to thereby generate first to Nth modulated signals whose frequency bands fail to overlap one another;

an adder for adding the first to Nth modulated signals respectively outputted from the first to Nth digital amplitude phase shift keying circuits;

a magnetic recording and reproducing circuit for recording an output signal of the adder on a magnetic recording medium and for reproducing the recorded signal from the magnetic recording medium;

first to Nth filters for respectively taking out first to Nth reproduced modulated signals from a reproduced signal from the magnetic recording and reproducing circuit;

first to Nth demodulation circuits for demodulating the first to Nth reproduced demodulated signals outputted from the first to Nth filters, respectively;

first to Nth decoders for decoding first to Nth demodulated signals outputted from the first to Nth demodulation circuits, respectively; and a mixing circuit for mixing first to Nth decoded signals respectively outputted from the first to Nth decoders by inversely processing the operation of the dividing circuit thereby to generate a reproduced signal of one sequence.

With the structure as shown above, a plurality of modulated signals are frequency-multiplexed and recorded, so that almost the whole frequency band recordable on a magnetic recording medium can be utilized and the recording density can be increased.

In another aspect of the invention, a modulated signal is frequency-multiplexed with a pilot signal which is produced by frequency-converting a carrier, and recorded/reproduced. The carrier is recovered from the reproduced pilot signal, so that a redundant part for reproducing the carrier is not necessary.

DESCRIPTION OF THE PREFERRED EMBODIMENTS

Figure 1:
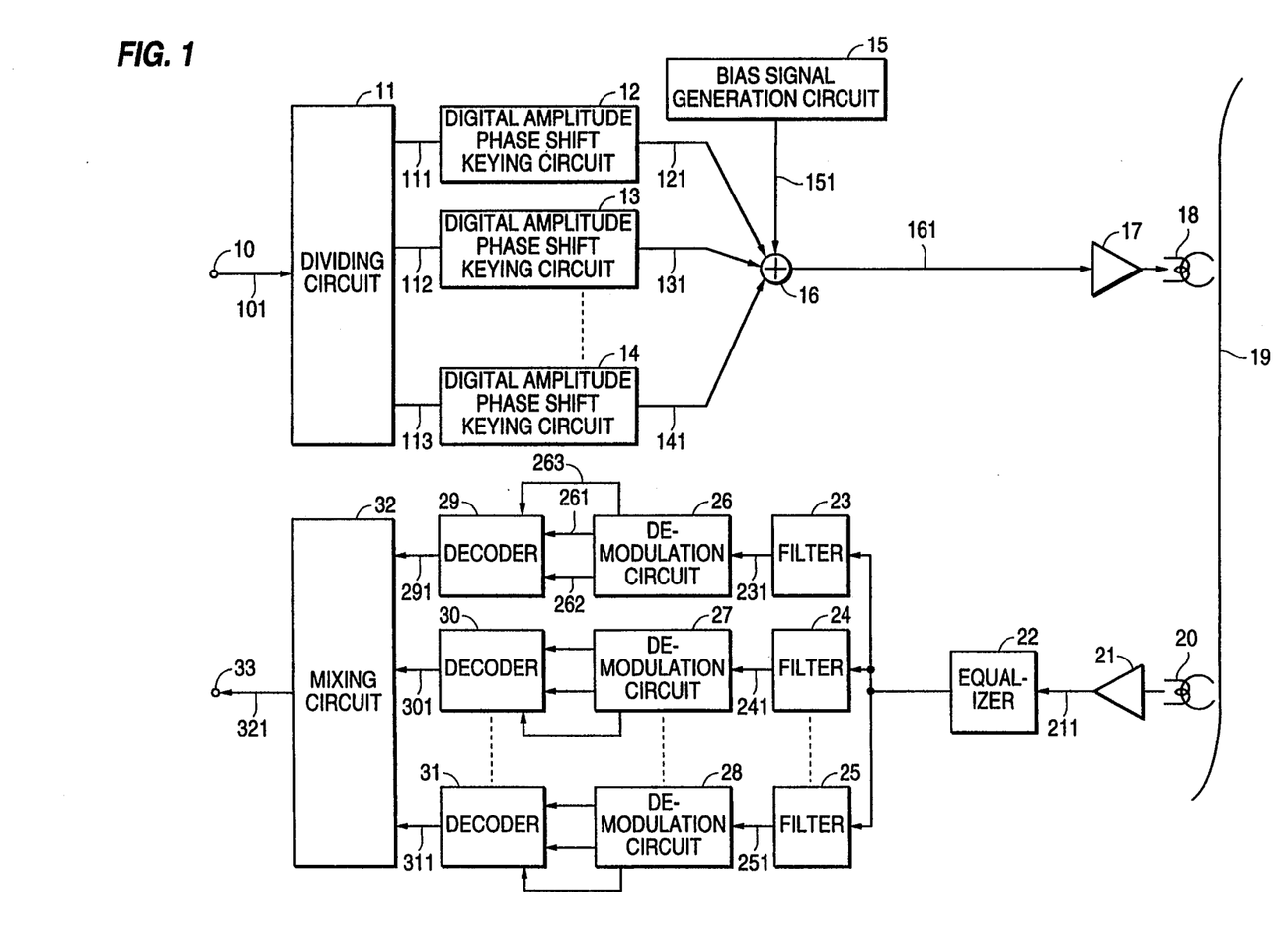
FIG. 1 is a block diagram of a digital signal magnetic recording/reproducing apparatus according to a first embodiment of this invention.

Preferred embodiments will be described below by referring to the drawings. FIG. 1 is a block diagram of a digital signal magnetic recording/reproducing apparatus according to a first embodiment of this invention. In FIG. 1, a digital signal 101 to be recorded is inputted to a terminal 10. The digital signal 101 thus inputted is fed to a dividing circuit 11. In the dividing circuit 11, for example, an input signal of 9 bits is divided into three sequential digital signals of 4 bits, 3 bits and 2 bits (which are respectively shown at 111, 112 and 113 in FIG. 1). The three sequential digital signals 111, 112 and 113 are fed to digital amplitude phase shift keying circuits 12, 13 and 14, respectively, for digital modulation.

Figure 2:
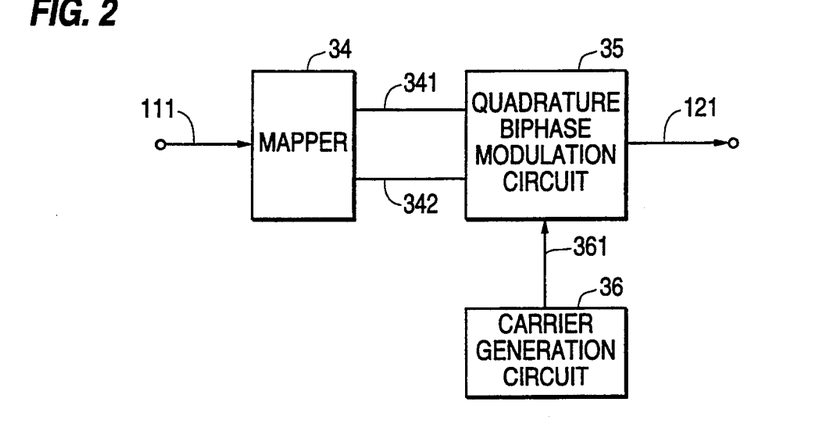
FIG. 2 is a block diagram of a digital amplitude phase shift keying circuit shown in FIG. 1.
Figure 3:
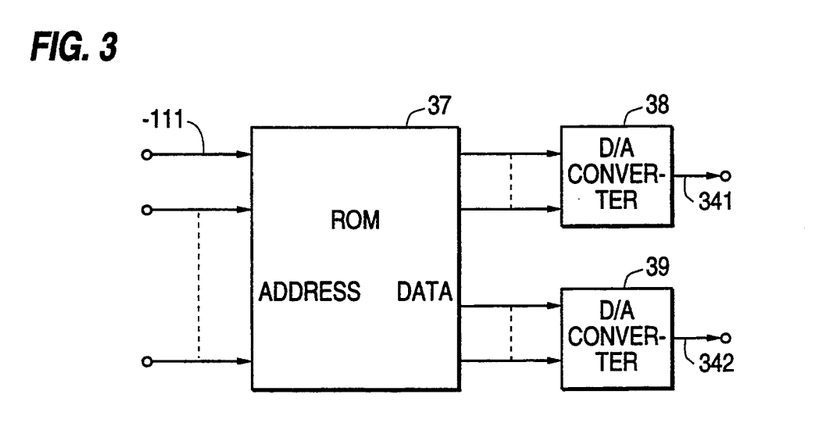
FIG. 3 is a block diagram of a mapper circuit shown in FIG. 1.

For example, the 4-bit signal 111 is converted through the digital amplitude phase shift keying circuit 12 into a 16-value quadrature amplitude modulated (QAM) signal which is obtained by adding two 4-value amplitude modulated signals amplitude-modulated by carriers different in phase from each other by 90°. Also, the 3-bit signal 112 becomes an 8-phase phase shift keying (PSK) signal by the digital amplitude phase shift keying circuit 13. In addition, the 2-bit signal 113 becomes a 4-phase PSK signal by the digital amplitude phase shift keying circuit 14. The carrier frequencies in the digital amplitude phase shift keying circuits 12, 13 and 14 are respectively set so that the frequency bands of the modulated signals 121, 131 and 141 which are outputted respectively from the circuits 12, 13 and 14 do not overlap each other. The digital amplitude phase shift keying circuit 12 comprises, as shown in FIG. 2, a mapper circuit 34, a quadrature biphase modulation circuit 35 and a carrier generation circuit 36. The mapper circuit 34 includes, as shown in FIG. 3, a read only memory (ROM) 37, and digital/analog (D/A) converters 38 and 39. When the 16-value QAM method is used, the inputted 4-bit digital signal 111 corresponds to the 16 points shown with a mark of a circle in the signal point arrangement diagram shown in FIG. 5. For example, if the inputted 4-bit data is 0001, the IQ signals representing the position of the point 42 are outputted from the ROM 37, and if it is 1000, the IQ signals representing the position of the point 43 are outputted therefrom, which are respectively converted through the D/A converters 38 and 39 into analog signals. The signals of two sequences consisting of an I signal 341 and a Q signal 342 which are outputted from the mapper circuit 34 and a carrier 361 of a specified frequency which is an output signal of the carrier generation circuit 36 are sent to the quadrature biphase modulation circuit 35.

Figure 4:
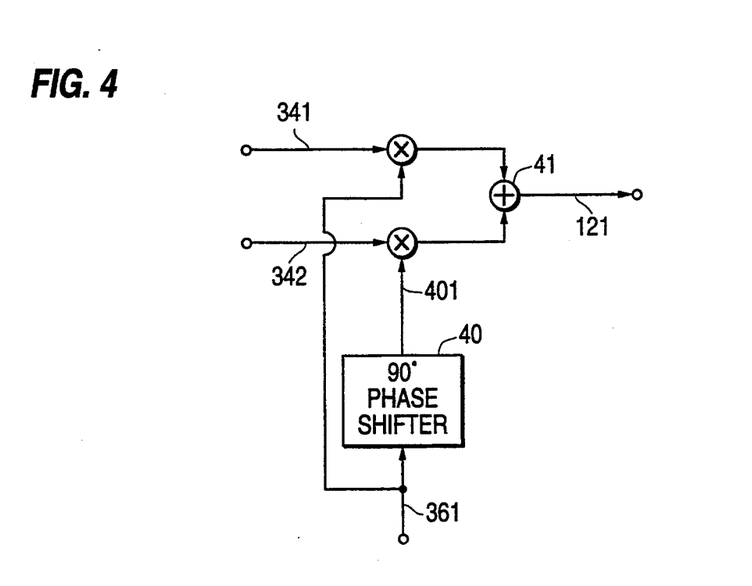
FIG. 4 is a block diagram of a quadrature biphase modulation circuit shown in FIG. 1.

The quadrature biphase modulation circuit 35 is schematically shown in FIG. 4. The I signal 341 and the Q signal 342 are respectively amplitude-modulated by a carrier 361 and a 90° shifted carrier 401 from a 90° phase shifter 40, and added by an adder 41. The 90° phase shifted carrier 401 is a 90° phase shifted signal of the carrier 361. The signal thus added is outputted as the modulated signal 121 from the digital amplitude phase shift keying circuit 12. The digital amplitude phase shift keying circuits 13 and 14 are the same in structure as the circuit 12 excepting that the point data stored in ROM of a mapper circuit are different. The mapping points of 8PSK and 4PSK are shown with a mark of a circle in FIGS. 6 and 7, respectively.

Figure 8:
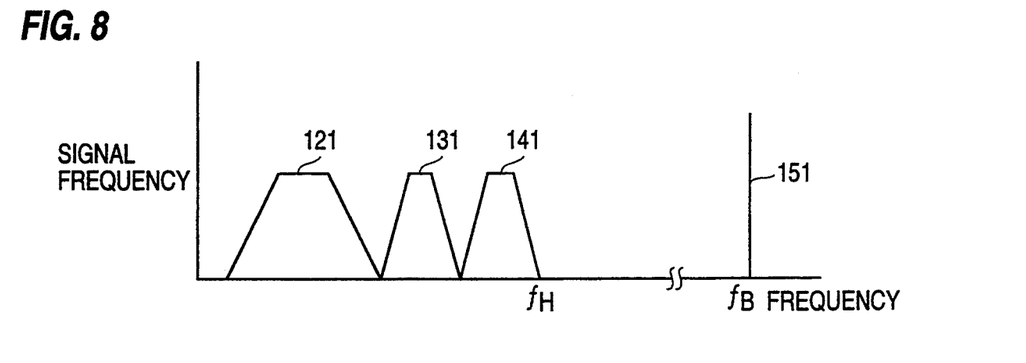
FIG. 8 schematically shows a frequency allocation of the recording signals.

The three amplitude phase shift keyed signals 121, 131 and 141 are added through an adder 16 to a bias signal 151 sent from a bias signal generation circuit 15. The signal 161 thus obtained is recorded through a recording amplifier 17 and a magnetic head 18 on a magnetic recording medium 19. The frequency allocation of the signals outputted from the adder 16 and recorded on the magnetic recording medium 19 is shown in FIG. 8. In this case, the reason of effecting bias recording is that mutual interference between these three signals 121, 131 and 141 is to be prevented by making the magnetic recording and reproducing process linear. In addition, in order to prevent the interference component between the bias signal 151 and the three modulated signals 121, 131 and 141 from being entered into the modulated signal band, the bias frequency $f_B$ is set at least as high as three times the maximum frequency $f_H$ of the modulated signals.

Figure 9:
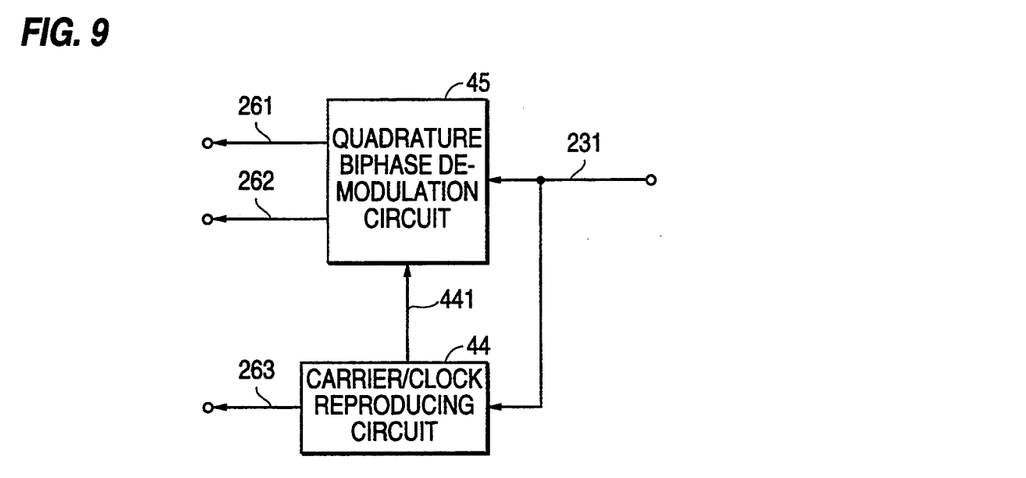
FIG. 9 is a block diagram of a demodulation circuit shown in FIG. 1.

The signal recorded on the magnetic recording/reproducing medium 19 is reproduced by the magnetic head 20 and amplified through a reproducing amplifier 21. The reproduced modulated signal 211 outputted from the reproducing amplifier 21 is sent to an equalizer 22 to correct for the deterioration of the frequency characteristics generated in the magnetic recording/reproducing system. The signal thus corrected is separated into three modulated signals of 16QAM, 8PSK and 4PSK respectively through three filter circuits 23, 24 and 25. The three modulated signals 231, 241 and 251 are sent to the demodulation circuits 26, 27 and 28 for demodulation, respectively. As shown in FIG. 9, the demodulation circuit 26 comprises a carrier/clock generation circuit 44 and a quadrature biphase demodulation circuit 45. The carrier/clock generation circuit 44 outputs a reproduced carrier 441 to the quadrature biphase demodulation circuit 45 and a reproduced clock signal 263 specifying the decoding timing to a decoding circuit 29. As the method of reproducing the carrier, for example, a known method may be used in which a burst signal having the same frequency and phase as those of the carrier is partially added to the recording signal and when reproduced, a continuous carrier is reproduced from the burst signal, or the Costas method (e.g., Kuwabara; "Digital Microwave Communication, Projection Center", pp. 118 to 122, published on 25, May, 1984) may be used. In addition, the reproduced clock signal is of the same frequency as that of the reproduced carrier, or of a frequency N/M times (N and M are integers numbers) that of the reproduced carrier.

Figure 10:
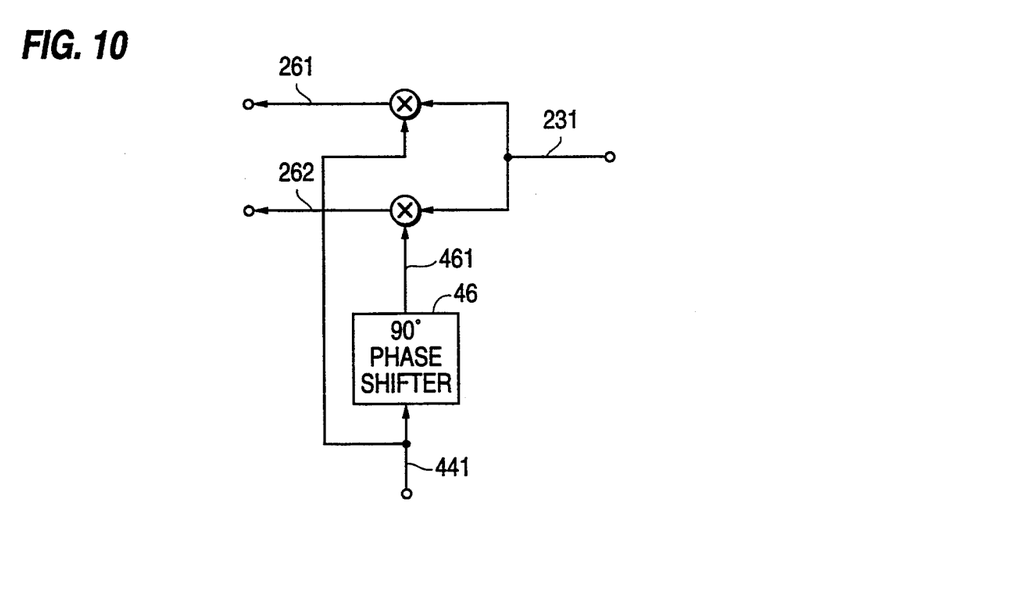
FIG. 10 is a block diagram of a quadrature biphase demodulation circuit shown in FIG. 1.

The quadrature biphase demodulation circuit 45 has a structure as shown in FIG. 10, in which the reproduced modulated signal 231 is demodulated by the reproduced carrier 441 and a reproduced 90° phase shifted carrier 461 from a 90° phase shifter so as to thereby generate a reproduced I signal 261 and a reproduced Q signal 262.

Figure 5:
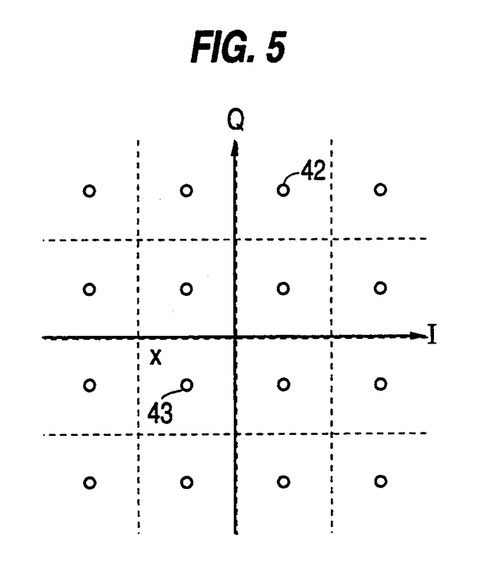
FIG. 5 shows a mapping points arrangement used in a 16-value quadrature amplitude modulation (QAM) technique.

The reproduced I signal 261 and reproduced Q signal 262 are synchronized with the reproduced clock 263 and decoded through the decoding circuit 29. In this case, 4-bit data corresponding to a reference point where the Euclid distance between the 16 reference points and a point on the IQ plane represented by the reproduced I and Q signals is minimized is outputted as the decoded signal. For example, when the point on the IQ plane represented by the reproduced I and Q signals is marked by an (X) as shown in FIG. 5, the 4-bit data corresponds to data to which the reference point 43 where the Euclid distance between the point marked with an X and the 16 reference points is minimized; for example, 1000 is outputted as the decoded data. That is, the decoded data is determined depending on the area where the reproduced decoded data is positioned in the IQ plane which is divided into areas by the broken line as shown in FIG. 5.

Figure 6:
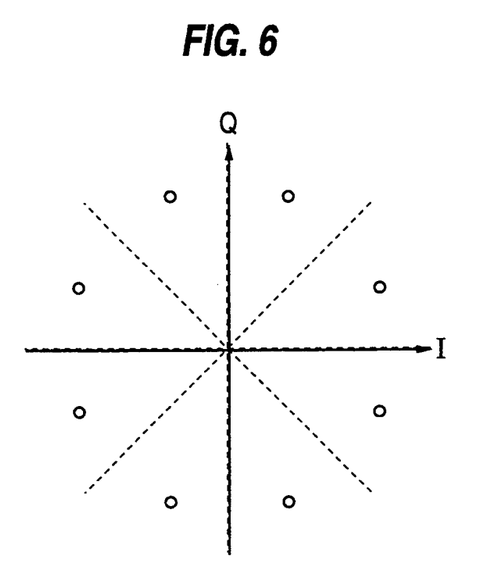
FIG. 6 shows a mapping points arrangement used in an 8-phase phase shift keying (PSK).
Figure 7:
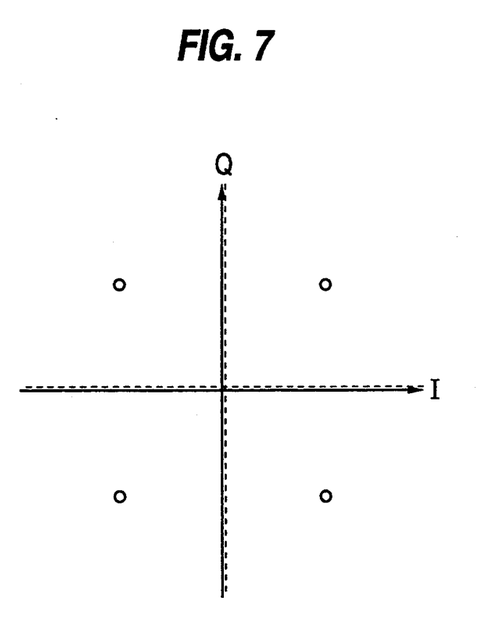
FIG. 7 shows a mapping points arrangement used in a 4-phase PSK technique.

Similarly, the 8PSK and 4PSK signals are demodulated in the demodulation circuits 27 and 28 and decoded by the decoding circuits 30 and 31 so as to be judged the area as shown by the broken lines in FIGS. 6 and 7, respectively. Three sequential decoded data 291, 301 and 311 respectively outputted from the decoding circuits 29, 30 and 31 are inputted to a mixing circuit 32 so as to thereby generate one sequential decoded data signal 321. For example, the three sequential decoded data signal of 4 bits, 3 bits and 2 bits are collected to form one sequential 9-bit data signal and outputted to an output terminal 33.

In addition, the frequency allocation of each of the modulated signals is set so that the error rates of the three sequential decoded signals 291, 301 and 311 corresponding to the three sequential input data 111, 121 and 131 are different. The data part which should particularly not contain errors (the error correcting code part or the upper bit part of a video data when the error correcting code is added, etc.) may be allocated to the input data corresponding to the decoded data having the lowest error rate among the three sequential signals, so that the recording rate can be enhanced. For example, if the error rate of the reproduced decoded data 311 subjected to the 4PSK modulation is $10^{-5}$, and that of the reproduced decoded data 301 subjected to the 8PSK modulation is $10^{-4}$ and that of the reproduced decoded data 291 subjected to 16QAM modulation is $10^{-3}$, the error correcting code part may be allocated to the 4PSK modulation sequence which has low error rate and the other parts may be allocated to the 8PSK and 16QAM sequences, so that the error rate after correction can be improved further than when the three sequential reproduced decoded data are set so as to have equal error rates. In addition, when a video signal only is to be recorded, the upper 2 bits may be allocated to the 4PSK modulation sequence, the next 3 bits may be allocated to the 8PSK modulation sequence and the lower 4 bits may be allocated to the 16QAM sequence. As a result, the picture quality of a reproduced image can be improved as compared with that obtained when the three sequential reproduced decoded data have equal error rates.

In addition, in the abovenoted description, an input signal of 9 bits is divided into three sequential signals of 4 bits, 3 bits and 2 bits, and then subjected to 16QAM, 8PSK and 4PSK modulation techniques respectively, and recorded, but the present invention is not limited thereto, and other ways of division, bit allocation and modulation can be similarly satisfactorily used for this purpose.

Further in addition, if the error rate of the reproduced data is different for each of the modulated signals which are frequency-multiplexed, the data part which should particularly not contain errors (the error correcting code part, the upper bit part of a video data or the like) is allocated to the modulated signal which has lowest error rate.

Figure 11:
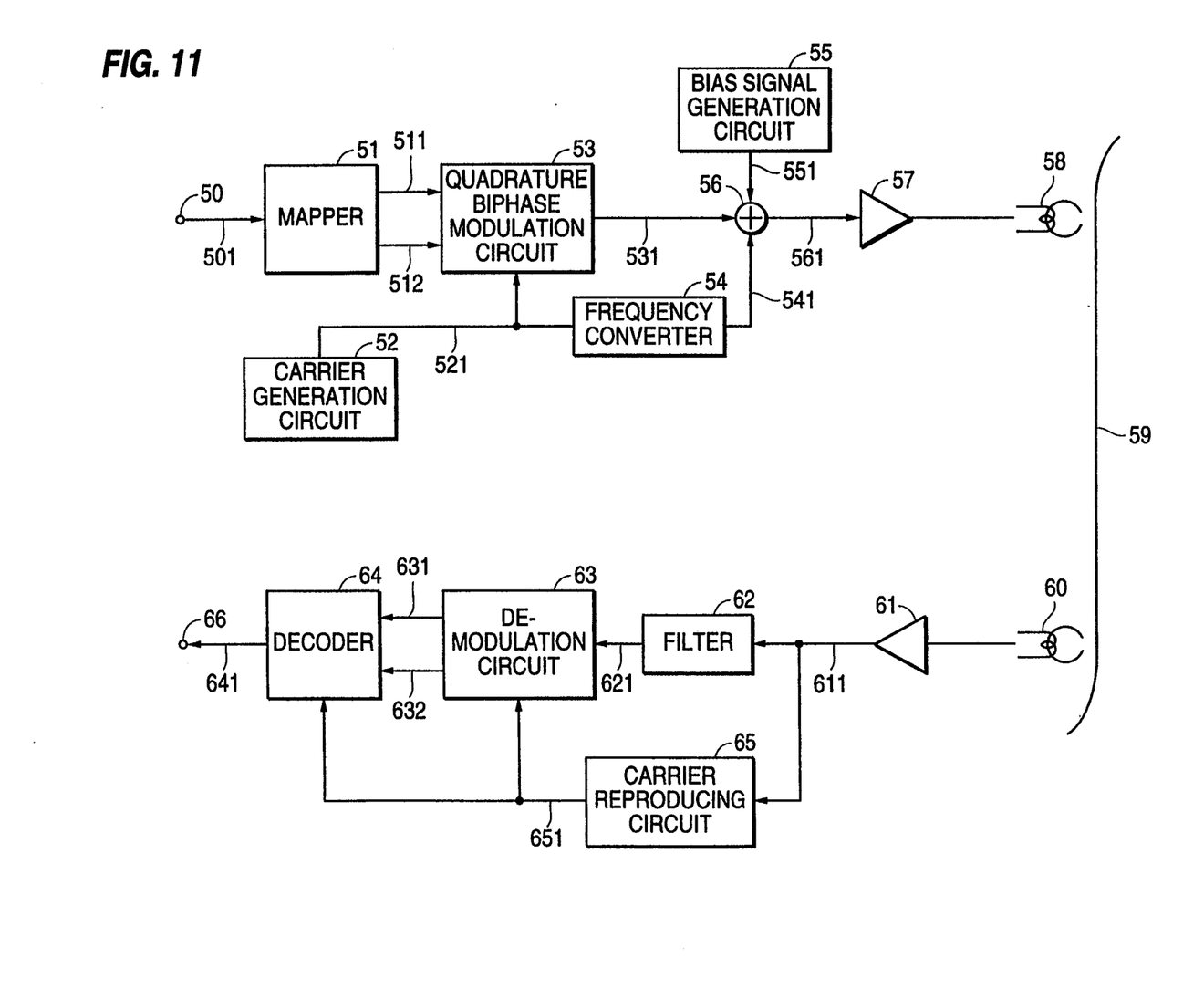
FIG. 11 is a block diagram of a digital signal magnetic recording/reproducing apparatus according to a second embodiment of this invention.
Figure 12:
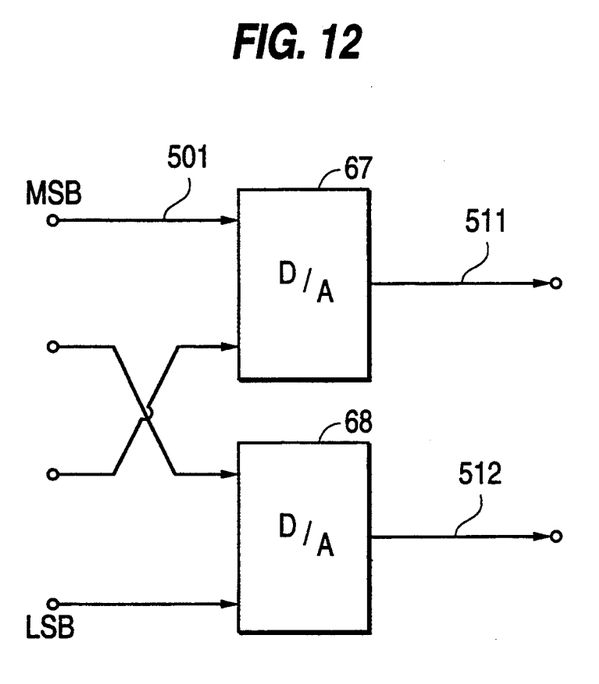
FIG. 12 is a block diagram of a mapper circuit shown in FIG. 11.
Figure 13:
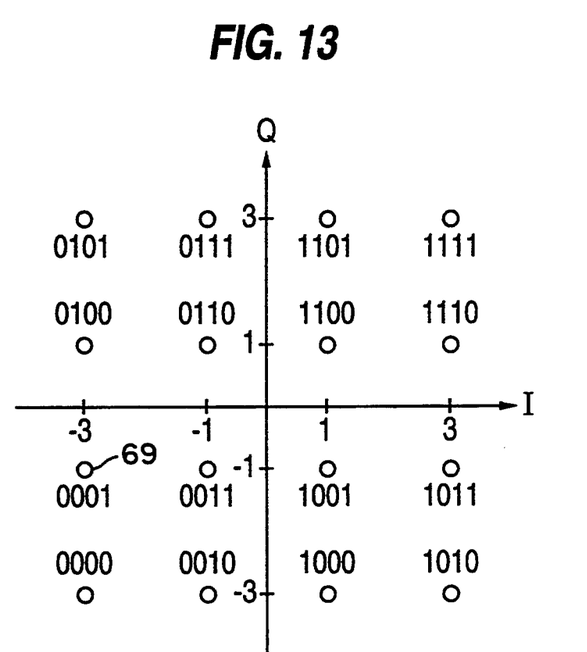
FIG. 13 shows a mapping points arrangement used in a 16-value QAM technique.

A second embodiment of this invention is shown in FIG. 11. A digital signal to be recorded is inputted to a terminal 50. The digital signal 501 thus inputted is fed to a mapper circuit 51. When the 16QAM modulation method is used, the digital signal 501 is inputted to the mapper circuit 51 in 4-bit units. The mapper circuit 51 comprises two digital/analog (D/A) converters 67 and 68 as shown in FIG. 12. The digital signal 501 corresponds to 16 points markedly shown by circles on the IQ plane in FIG. 13. The D/A converters 67 and 68 output an I signal 511 and a Q signal 512, respectively. For example, if the inputted 4-bit data is 0001, the point 69 corresponds thereto. The point 69 has an I signal output value of $-3$ and a Q signal output value of $-1$. The two sequential signals comprising the I signal 511 and the Q signal 512, each being output from the mapper circuit 51, and the carrier 512, which is an output of the carrier generation circuit 52, are inputted to the quadrature biphase modulation circuit 53.

Figure 14:
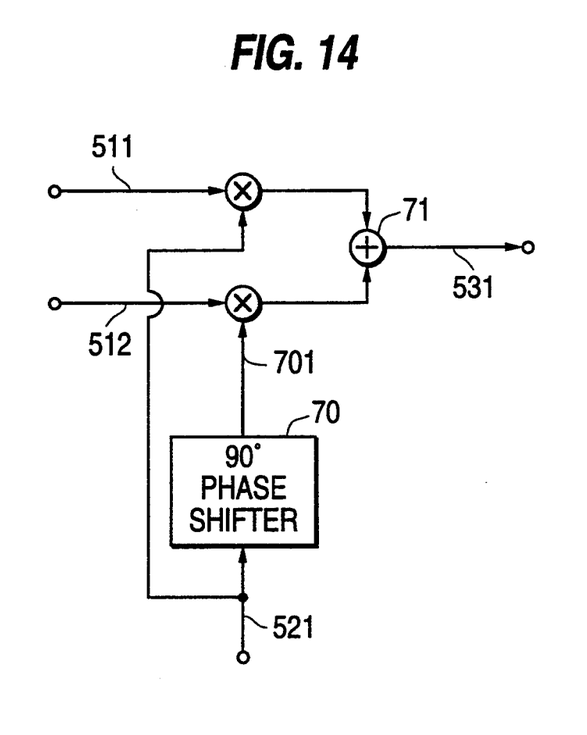
FIG. 14 is a block diagram of a quadrature biphase modulation circuit shown in FIG. 11.

The quadrature biphase modulation circuit 53 is schematically shown in FIG. 14. The I signal 511 and Q signal 512 are respectively modulated by a carrier 521 and a 90° phase shifted carrier 701 from a 90° phase shifter 70 and added by an adder 71. The thus obtained signal is outputted from the quadrature biphase modulation circuit 53 as a modulated signal 531. The carrier 521 output from carrier generation circuit 52 is frequency-converted by a frequency converter 54 to generate a pilot signal 541. If the frequency of the pilot signal 541 is expressed as $f_p$ and the minimum frequency and the maximum frequency of the modulated signal 531 are expressed as $f_L$ and $f_H$, respectively, the frequency $f_p$ is set so as to satisfy the following condition:

$$f_P < f_L \text{ or } f_P > f_H$$

Also, if the frequency of a bias signal 551 from a bias signal generation circuit 55 is expressed as $f_B$, the frequency $f_B$ is set so as to satisfy the following condition:

$$f_B > 3 \cdot \max (f_H, f_P)$$

Figure 15:
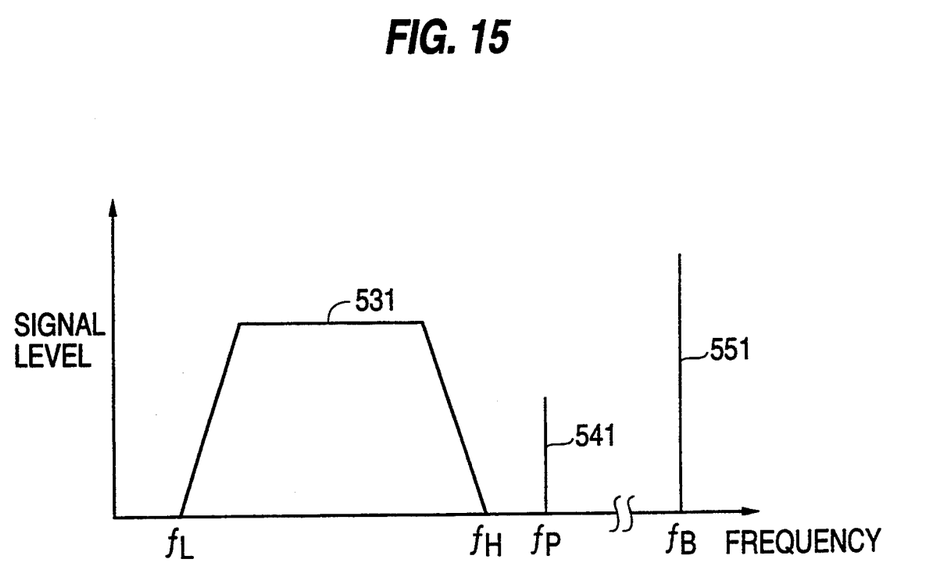
FIG. 15 schematically shows a frequency allocation of the recording signals.

The modulated signal 531, pilot signal 541 and bias signal 551 are frequency-multiplexed through an adder 56 and the multiplexed signal thus obtained 561 is sent through a recording amplifier 57 and a magnetic head 58 to a magnetic recording medium 59 for recording. The frequency allocation of the multiplex signal 561 to be recorded is shown in FIG. 15.

The recorded signal on the magnetic recording medium 59 is reproduced by a magnetic head 60 and amplified by a reproducing amplifier 61. The reproduced signal 611 outputted from the reproducing amplifier 61 is fed to a carrier reproducing circuit 65 and a filter circuit 62.

Figure 16:
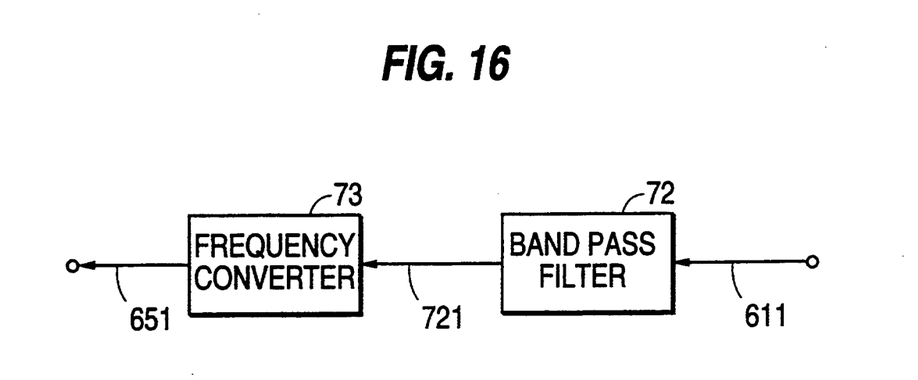
FIG. 16 is a block diagram of a carrier/clock reproducing circuit shown in FIG. 9.

The carrier reproducing circuit 65 is schematically shown in FIG. 16. From the reproduced signal 611, only the frequency component of the pilot signal is taken out by a bandpass filter 72 and sent to a frequency converter 73 as a reproduced pilot signal 721. In the frequency converter 73, the frequency of the reproduced pilot signal 721 is returned to that of the carrier and out output as the reproduced carrier 651.

In the filter 62, only the frequency component of the modulated signal is output from the reproduced signal 611 and supplied to a demodulation circuit 63 as a reproduced modulated signal 621.

Figure 17:
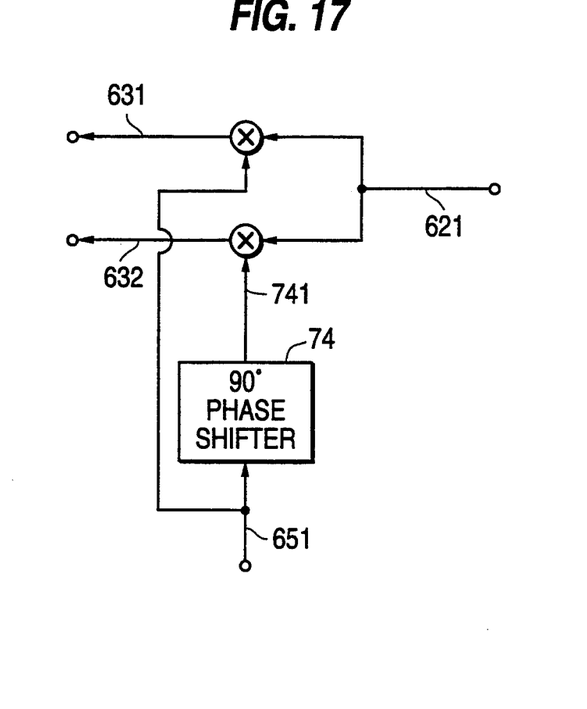
FIG. 17 is a block diagram of a demodulation circuit shown in FIG. 11.

The demodulation circuit 63 is schematically shown in FIG. 17. The reproduced modulated signal 621 is demodulated by the reproduced carrier 651 from the carrier generation circuit 65 and a reproduced 90° phase shifted carrier 741 from a 90° phase shifter 74 to generate a reproduced I signal 631 and a reproduced Q signal 632.

Figure 18:
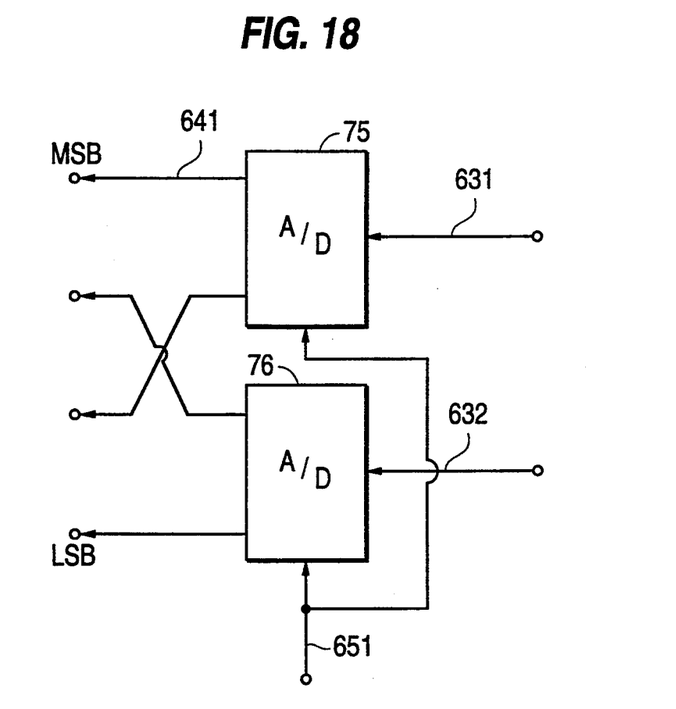
FIG. 18 is a block diagram of a decoder circuit shown in FIG. 11.
Figure 19:
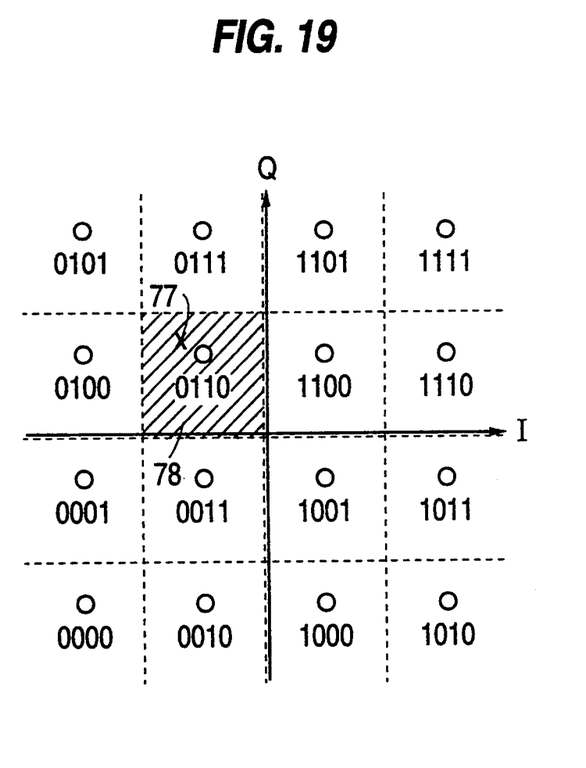
FIG. 19 schematically shows the decoding area on the IQ plane.

The reproduced I signal 631 and reproduced Q signal 632 are decoded by a decoding circuit 64 to generate a decoded data 641. As shown in FIG. 18, the decoding circuit 64 comprises two analog/digital (A/D) converters 75 and 76, and depending on the area where the reproduced I signal 631 and reproduced Q signal 632 are positioned in the IQ plane which is divided into areas by the broken lines as shown FIG. 19, outputs data corresponding to such an area. For example, if the inputted reproduced I signal 631 and reproduced Q signal 632 are correspond to a point 77 indicated by a mark X, these signals are judged to exit in a shaded area 78, and the data of 0110 is outputted from a terminal 66.

In addition, the abovenoted description assumes that the 16QAM modulation technique is used, but the present invention is not limited thereto, and other amplitude phase shift keying methods can be similarly satisfactorily used for this purpose. Also, in this embodiment, the carrier and the clock are of the same frequency, but the carrier frequency may be of a frequency M/N times (M and N are integers) that of the clock.

What is claimed is:

1. A digital signal magnetic recording/reproducing apparatus comprising:
    a divider, said divider dividing an input digital signal into first to Nth digital signals (N is an integer of 2 or more) each having a specified number of bits;
    first to Nth amplitude phase shift keyers, said keyers respectively performing digital amplitude phase shift keyings of said first to Nth digital signals outputted from said divider means so as to thereby generate first to Nth modulated signals having respective carrier frequencies which are different from one another such that frequency bands of said first to Nth modulated signals fail to overlap one another;
    an adder, said adder adding said first to Nth modulated signals respectively outputted from said first to Nth digital amplitude phase shift keyers;
    a magnetic recording and reproducing means for recording an output signal from said adder on a magnetic recording medium and for reproducing the recorded signal from said magnetic recording medium;
    first to Nth filters, said filters respectively taking out first to Nth reproduced modulated signals from a reproduced signals from said magnetic recording and reproducing means;
    first to Nth demodulators, said demodulators respectively demodulating the first to Nth reproduced modulated signals respectively outputted from said first to Nth filters;
    first to Nth decoders, said decoders respectively decoding first to Nth demodulated signals respectively outputted from said first to Nth demodulators; and
    a mixer, said mixer mixing first to Nth decoded digital signals respectively outputted from said first to Nth decoders by inversely processing the operation of said divider so as to thereby generate a reproduced digital signal of one sequence;
    wherein said first Nth digital signals are in the order from the lowest to highest in allowable error, and said first to Nth amplitude phase shift keyers are in the order form the lowest to highest in error rate after demodulating and decoding a modulated signal obtained thereby.

2. A digital signal magnetic recording/reproducing apparatus as claimed in claim 1, wherein said magnetic recording and reproducing means includes means for superposing on said first to Nth modulated signals a bias signal of a single frequency higher than a maximum frequency of said first to Nth modulated signals.

3. A digital signal magnetic recording/reproducing apparatus as claimed in claim 1, wherein said bias signal is of a single frequency which is as high as at least three times the maximum frequency of said first to Nth modulated signals.

4. A digital signal magnetic recording/reproducing apparatus comprising:
    a divider, said divider dividing an input digital signal into first to Nth digital signals (N is an integer of 2 or more) each having a specified number of bits;

first to Nth amplitude phase shift keyers, said keyers respectively performing digital amplitude phase shift keyings of said first to Nth digital signals outputted from said divider so as to thereby generate first to Nth modulated signals having respective carrier frequencies which are different from one another such that frequency bands of said first to Nth modulated signals fail to overlap one another, each of said first to Nth amplitude phase shift keyers comprising a divider for dividing a corresponding one of said first to Nth digital signals into two signals, and a quadrature biphase modulator for quadrature biphase modulating said two signals to obtain a corresponding one of said first to Nth modulated signals;

an adder, said adder adding said first to Nth modulated signals respectively outputted from said first to Nth digital amplitude phase shift keyers;

a magnetic recording and reproducing means for recording an output signal from said adder on a magnetic recording medium and for reproducing the recorded signal from said magnetic recording medium;

first to Nth filters, said filters respectively taking out first to Nth reproduced modulated signals from a reproduced signals from said magnetic recording and reproducing means;

first to Nth demodulators, said demodulators respectively demodulating the first to Nth reproduced modulated signals respectively outputted from said first to Nth filters;

first to Nth decoders, said decoders respectively decoding first to Nth demodulated signals respectively outputted from said first to Nth demodulators; and a mixer, said mixer mixing first to Nth decoded digital signals respectively outputted from said first to Nth decoded digital signals respectively outputted from said first to Nth decoders by inversely processing the operation of said divider so as to thereby generate a reproduced digital signal of one sequence;

wherein said first to Nth digital signals are in the order form the lowest to highest in allowable error, and said first to Nth amplitude phase shift keyers are in the order from the lowest to highest in error rate after demodulating and decoding a modulated signal obtained thereby.

* * * * *